United States Patent [19]

Janutta et al.

[11] Patent Number: 4,502,456

[45] Date of Patent: Mar. 5, 1985

[54] APPARATUS FOR DRESSING GRINDING WHEELS

[75] Inventors: Reinhard Janutta, Geesthacht; Werner Redeker, Börnsen, both of Fed. Rep. of Germany

[73] Assignee: Hauni-Werke Körber & Co. KG, Hamburg, Fed. Rep. of Germany

[21] Appl. No.: 410,082

[22] Filed: Aug. 19, 1982

[30] Foreign Application Priority Data

Oct. 8, 1981 [DE] Fed. Rep. of Germany ....... 3139940

[51] Int. Cl.³ .............................................. B24B 53/08
[52] U.S. Cl. ............................. 125/11 CD; 51/48 HE
[58] Field of Search .................. 125/11 CD, 11 R; 51/48 HE, 287

[56] References Cited

U.S. PATENT DOCUMENTS

| | | | |
|---|---|---|---|
| 2,350,897 | 6/1944 | Jellis | 125/11 CD |
| 2,602,436 | 7/1952 | Lohutko | 125/11 CD |
| 2,824,556 | 2/1958 | Bateman | 125/11 CD |
| 2,919,519 | 1/1960 | Mahlmeister | 125/11 CD |
| 3,566,854 | 3/1971 | Nissen | 125/11 CD |

Primary Examiner—Harold D. Whitehead
Attorney, Agent, or Firm—Peter K. Kontler

[57] ABSTRACT

A grinding machine wherein the grinding wheel has a profile consisting of recurrent identical sections, as considered in the axial direction of the grinding wheel. The profile of the grinding wheel is treated by a dressing tool whose profile is that of a worm and is complementary to the profile of the grinding wheel. The axial length of the dressing tool equals that of one section of the profile of the grinding wheel and the axes of the grinding wheel and dressing tool make an angle which matches the lead angle of the worm-like profile of the tool. A feed screw is used to move the dressing tool in parallelism with the axis of the grinding wheel at a rate such that axial displacement of the tool per revolution of its shaft equals the axial length of one section of the profile of the grinding wheel. The grinding wheel is used to convert blanks into toothed racks.

9 Claims, 2 Drawing Figures

APPARATUS FOR DRESSING GRINDING WHEELS

BACKGROUND OF THE INVENTION

The present invention relates to grinding machines in general, and more particularly to improvements in apparatus for dressing the profiles of grinding wheels in grinding machines. Still more particularly, the invention relates to improvements in apparatus for dressing the profiles of grinding wheels of the type wherein the profile consists of iterative identical sections, as considered in the axial direction of the grinding wheel. Such grinding wheels can be used to cut teeth and tooth spaces into workpieces which are to be converted into toothed racks or the like. As a rule, the axial length of a grinding wheel which is used for cutting teeth and tooth spaces into a blank in order to convert the latter into a toothed rack or the like is quite pronounced and its profile is complementary to that of the finished product, i.e., the grinding wheel exhibits a plurality of circumferentially complete ribs alternating with circumferentially complete grooves.

Relatively long grinding wheels which can convert a workpiece into a complete toothed rack or the like, without necessitating any axial displacement of the grinding wheel with reference to the workpiece and/or vice versa, are preferred over relatively short grinding wheels for a number of reasons. Each of the iterative sections which together constitute the profile of such a grinding wheel includes a rib and a groove. Grinding wheels having such profiles are normally dressed by tools whose length matches the length of the grinding wheels. The dressing tool and the grinding wheel are set in rotary motion, the dressing tool is fed radially against the profile of the grinding wheel, and the dressing operation is completed when the dressing tool assumes a position at a certain distance from the axis of the grinding wheel. Alternatively, the dressing tool can constitute a diamond which is moved axially and radially of the profile of the grinding wheel by tracking a pattern or which performs such movements by being mounted in or on a follower advancing along a predetermined path, e.g., along a path defined by a cam groove. Each of these dressing techniques exhibits a number of drawbacks. Thus, a relatively long dressing tool is quite expensive and the means for guiding the diamond occupies a substantial amount of space.

OBJECTS AND SUMMARY OF THE INVENTION

An object of the invention is to provide a grinding machine with a grinding wheel whose profile consists of a series of neighboring iterative sections and to equip such grinding machine with novel and improved means for dressing the profile of the grinding wheel.

Another object of the invention is to provide a novel and improved apparatus for dressing the profiles of grinding wheels which are used for conversion of metallic blanks or the like into complete toothed racks or analogous products.

A further object of the invention is to provide a novel and improved dressing tool for use in an apparatus of the above outlined character.

An additional object of the invention is to provide novel and improved means for moving the dressing tool relative to the grinding wheel and/or vice versa.

Still another object of the invention is to provide a dressing tool which can complete the treatment of the profile of a grinding wheel within short periods of time and with a degree of accuracy at least matching that of heretofore known dressing tools, and whose useful life is longer than the useful life of conventional tools.

An additional object of the invention is to provide a dressing apparatus which can be installed in existing grinding machines as a superior substitute for heretofore known apparatus.

Another object of the invention is to provide a dressing apparatus whose controls are simple, which occupies little room and which can be readily adjusted to properly treat a wide variety of grinding wheels or like devices.

An additional object of the invention is to provide a novel and improved method of dressing grinding wheels of the type wherein the profile consists of several neighboring sections of identical design.

The invention is embodied in a grinding machine which comprises a rotary grinding wheel having a first profile including a plurality of identical sections disposed one next to the other, as considered in the axial direction of the grinding wheel, a rotary dressing tool whose axis is inclined with reference to the axis of the grinding wheel and which has a worm-like profile at least substantially complementary to a section of the first profile, and advancing means (e.g., an electric motor, a feed screw which is driven by the motor, and a yoke which carries the shaft of the tool and is reciprocable by the feed screw) for effecting a relative movement between the grinding wheel and the tool along a path such that the mutual inclination of the two axes remains unchanged. The first profile can resemble that of a toothed rack, and each of its sections can include a circumferentially complete rib and a circumferentially complete groove. The aforementioned path is preferably at least substantially parallel to the axis of the grinding wheel. The axial length of the dressing tool can be a fraction (for example, less or much less than one-third) of the axial length of the grinding wheel. In accordance with a presently preferred embodiment of the invention, the axial length of the dressing tool corresponds to the axial length of one 360°-turn of the second profile.

The arrangement is preferably such that the advancing means includes means for moving the dressing tool, during each revolution of the tool, through a distance corresponding to the axial length of one section of the first profile. The mutual inclination of the axes of the dressing tool and grinding wheel preferably equals or at least approximates the lead angle of the second profile. Such mutual inclination is preferably variable (e.g., by replacing the yoke for the shaft of the dressing tool with a yoke which maintains the dressing tool in a different orientation with reference to the grinding wheel).

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
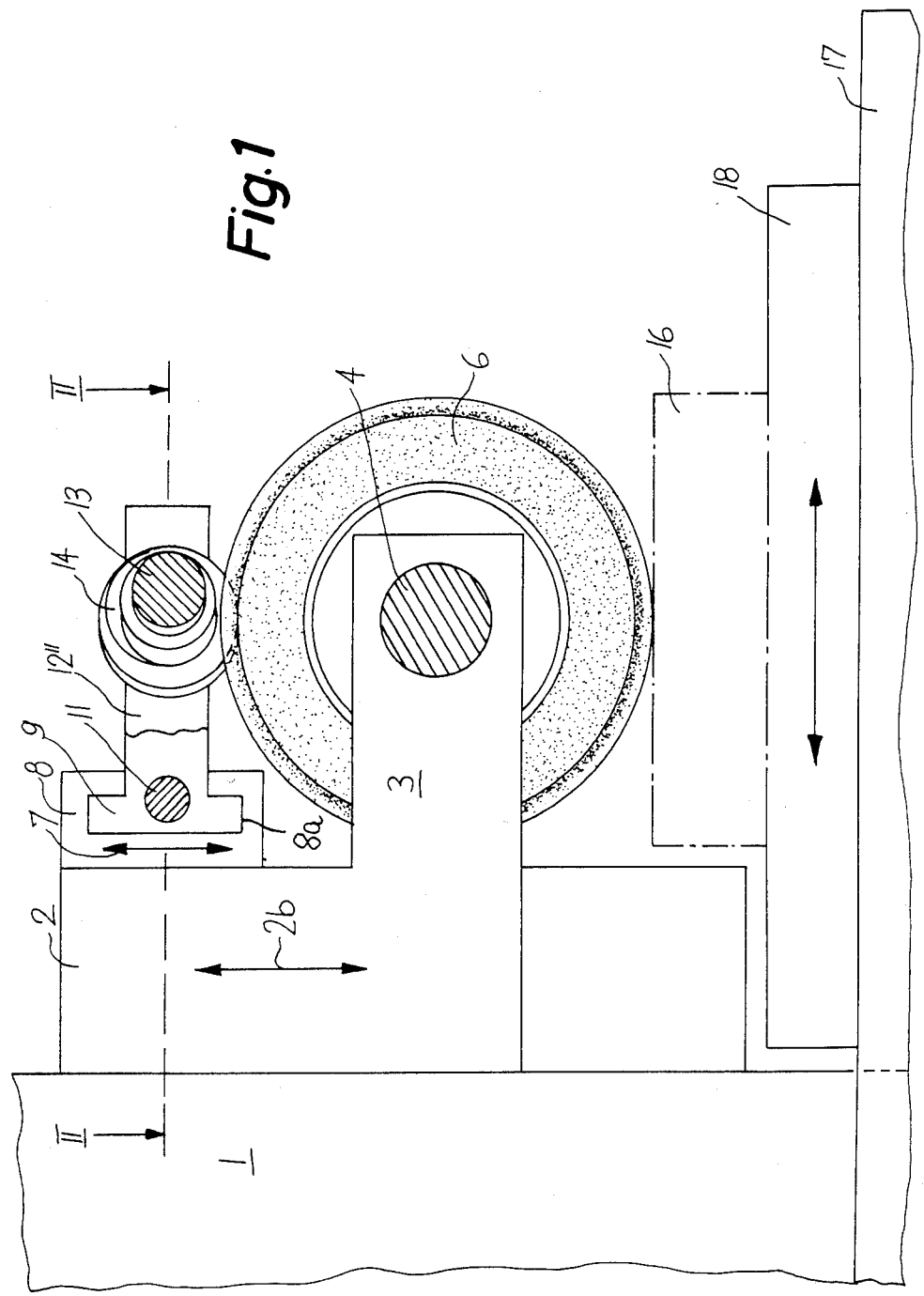
FIG. 1 is a fragmentary partly side elevational and partly vertical sectional view of a grinding machine which embodies the improved dressing apparatus.

Referring first to FIG. 1, there is shown a portion of a grinding machine including a base 17 and an upright column 1 which supports and guides a carrier 2 movable up and down as indicated by a double-headed arrow 2b. The carrier 2 has two horizontal arms 3 for the end portions of a horizontal shaft 4 which carries a profiled grinding wheel 6. The carrier 2 guides and supports a slide or carriage 8 which is reciprocable up and down in directions indicated by a double-headed arrow 7 and has a T-shaped groove 8a for a yoke 9 with forwardly extending arms 12' and 12" for the shaft 13 of a dressing tool in the form of a profiling roll 14. The carriage 8 supports a feed screw 11 which can be rotated to move the yoke 9 at right angles to the plane of FIG. 1, i.e., at right angles to the direction of reciprocatory movement of the carriage 8 along the carrier 2.

A workpiece 16 to be treated by the grinding wheel 6 is mounted on a work table 18 which is carried by the base 17 of the machine frame.

Figure 2:
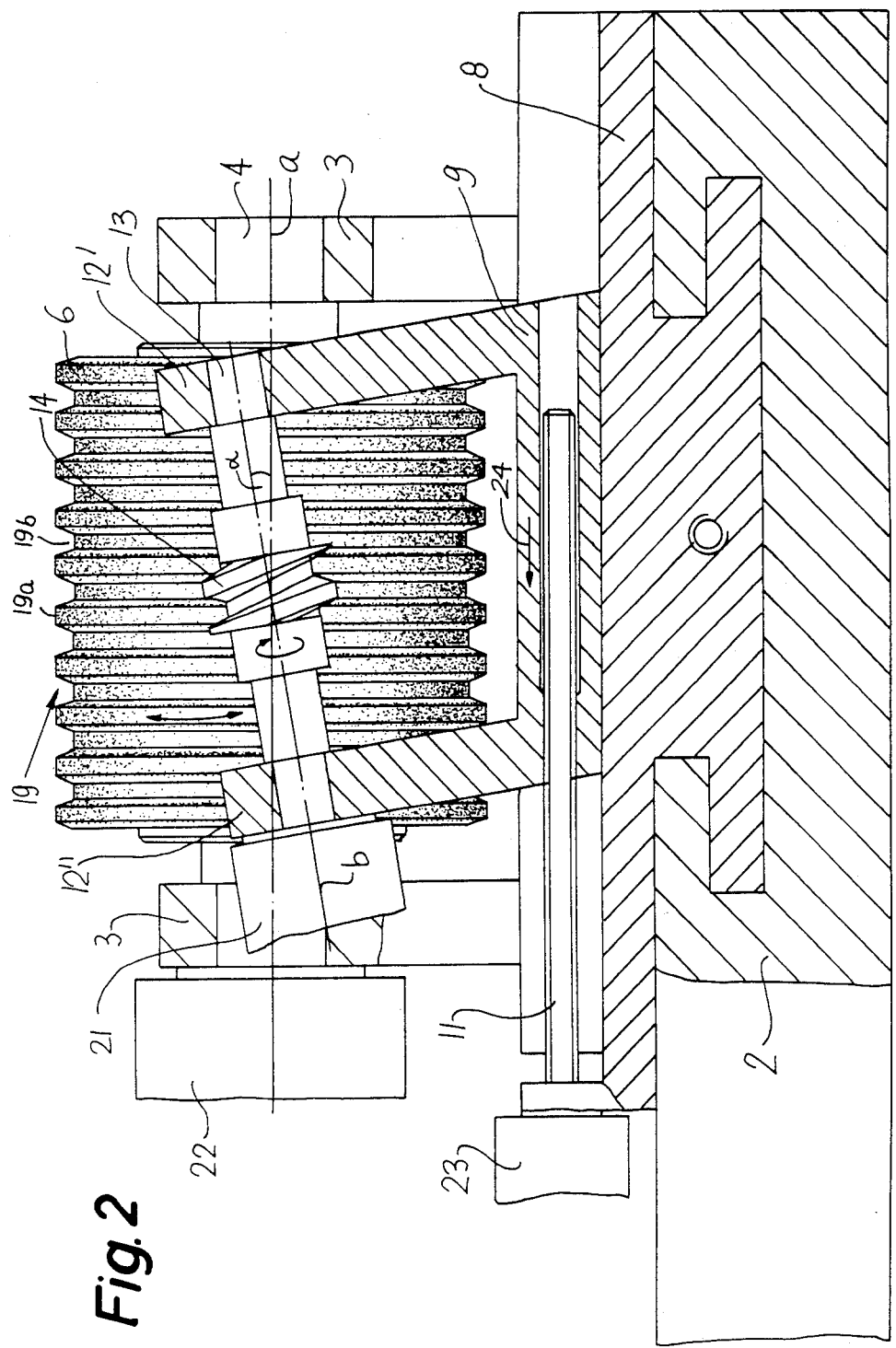
FIG. 2 is a horizontal sectional view substantially as seen in the direction of arrows from the line II—II of FIG. 1.

FIG. 2 shows that the grinding wheel 6 is a material removing tool of considerable length, as considered in the axial direction of the shaft 4. The peripheral portion of the grinding wheel 6 is formed with a regular profile 19 consisting of several iterative or recurrent sections or portions each formed with a circumferentially complete rib 19a and a neighboring circumferentially complete groove 19b. This enables the grinding wheel 6 to impart to the workpiece 16 a complementary profile whereby the workpiece is converted into a toothed rack or an analogous finished product.

The dressing tool 14 has a worm-like profile which is complementary to the profile 19 of the grinding wheel 6. The axis b of rotation of the dressing tool 14 and the axis a of the shaft 4 (i.e., the axis of the grinding wheel 6) make an acute angle alpha which matches the lead angle of the profile of the dressing tool 14. The length of the arm 12' exceeds that of the arm 12"; this accounts for the inclination of the axis b with reference to the axis a.

The grinding machine further comprises a first prime mover 21 which drives the dressing tool 14, a second prime mover 22 which drives the grinding wheel 6, and a third prime mover 23 which drives the feed screw 11. Each of the prime movers 21 to 23 can constitute an electric motor, and the motor 23 is reversible so that the yoke 9 can be moved in and counter to the direction indicated by the arrow 24. The means for moving the carrier 2 along the column 1 and the means for moving the carriage 8 up and down along the carrier 2 is not specifically shown in the drawing. Reference may be had to commonly owned copending application Ser. No. 232,250 filed Feb. 6, 1981 by Werner Redeker et al. for "Grinding Machine".

The operation is as follows:

The prime mover 21 is started to rotate the dressing tool 14 about the axis b, and the prime mover 22 is started to rotate the grinding wheel 6 about the axis a. The carriage 8 is moved downwardly, as viewed in FIG. 1 (to the illustrated position) so that the worm-like profile of the dressing tool 14 is moved to a position at a requisite distance from the axis a, i.e., so that the profile of the tool 14 can properly treat the profile 19 of the grinding wheel 6. The prime mover 23 is actuated to rotate the feed screw 11 and to move the yoke 9 with the entire dressing tool 14 in the direction of arrow 24, namely, in parallelism with the axis a of the grinding wheel 6. The inclination (angle alpha) of the axis b with reference to the axis a remains unchanged while the feed screw 11 moves the dressing tool 14 in parallelism with the axis a. The entire profile 19 is dressed when the tool 14 completes a linear movement from the one to the other axial end of the grinding wheel 6. The profile of the dressing tool 14 contacts the profile 19 only along a portion of the circumference of the continuously rotating grinding wheel 6. The length of the region of contact between the profiles of the parts 6 and 14 matches the length of one section of the profile 19, namely, one pitch or unit axial length of such recurrent profile. The speed of the prime mover 23 (i.e., the speed of movement of the dressing tool 14 and yoke 9 in parallelism with the axis a of the grinding wheel 6) is selected in such a way that the rate of forward movement of the dressing tool 14 per revolution corresponds to the axial length of one section of the composite profile 19 of the grinding wheel. This ensures that each and every portion of the profile 19 is treated uniformly and that the dressing of the entire grinding wheel 6 is completed in response to a single pass of the tool 14 from the one to the other axial end of the grinding wheel.

The aforementioned positioning or orientation of the dressing tool 14 relative to the grinding wheel 6 and the aforediscussed configuration of the profile of the tool 14 (namely, a worm-like profile) ensure that a relatively short dressing tool can be used to complete the treatment of a relatively long grinding wheel. As shown in FIG. 2, the axial length of the dressing tool 14 may be a minute fraction (not more than one-third) of the axial length of the grinding wheel 6. The utilization of a relatively short dressing tool reduces the initial cost of such tool and contributes to simplicity of the entire dressing apparatus in the grinding machine. Moreover, the controls (not specifically shown) which regulate the speeds of various prime movers are very simple and take up little room. All that is necessary is to properly relate the speed of rotary movement of the grinding wheel 6 to the speed of rotary movement of the dressing tool 14 and to properly relate the speed of rotary movement of the dressing tool to the speed of the yoke 9 in the direction of arrow 24. Moreover, by properly selecting the relationship between the peripheral speeds of the grinding wheel 6 and the dressing tool 14, one can readily influence the finish of the surface of the profile 19. Still further, by changing the inclination of the axis b with reference to the axis a, the attendant can alter the profile 19 of the grinding wheel 6. It has been found that the useful life of the improved dressing tool 14 is surprisingly long; the simplicity of the dressing apparatus is believed to contribute to the service life of the tool.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. In a grinding machine, the combination of a rotary grinding wheel having a first profile which is other than a helical profile and includes a plurality of identical sections disposed one next to the other, as considered in the axial direction of said wheel; a rotary dressing tool whose axis is inclined with reference to the axis of said grinding wheel and whose axial length is a fraction of the axial length of said grinding wheel, said tool having a worm-like second profile at least substantially complementary to a section of said first profile; and advancing means for effecting a relative movement between said grinding wheel and said tool along a path such that the mutual inclination of said axes remains unchanged.

2. The combination of claim 1, wherein said first profile is that of a toothed rack.

3. The combination of claim 1, wherein said advancing means includes means for moving said tool, said path being at least substantially parallel to the axis of said grinding wheel.

4. The combination of claim 1, wherein the axial length of said tool corresponds to the axial length of one 360°-turn of said second profile.

5. The combination of claim 1, further comprising means for rotating said tool, said advancing means including means for moving said tool, during each revolution of the tool, through a distance corresponding to the axial length of one section of said first profile.

6. The combination of claim 1, wherein the mutual inclination of said axes at least approximates the lead angle of said second profile.

7. The combination of claim 1, wherein the mutual inclination of said axes is variable.

8. The combination of claim 1, wherein said first profile includes circumferentially complete ribs and circumferentially complete grooves alternating with said ribs.

9. The combination of claim 8, wherein each of said sections includes a rib and a groove.

* * * * *